United States Patent [19]

Gale et al.

[11] Patent Number: 5,305,107
[45] Date of Patent: Apr. 19, 1994

[54] COMBINING DIGITAL VIDEO KEY SIGNALS

[75] Inventors: Timothy K. Gale; Mukundbhai C. Patel; Peter Smith, all of Newbury, England

[73] Assignee: Alpha Image Limited, England

[21] Appl. No.: 763,114

[22] Filed: Sep. 20, 1991

[30] Foreign Application Priority Data

Apr. 12, 1991 [GB] United Kingdom ............. 9107851.9

[51] Int. Cl.$^5$ ............................................ H04N 5/262
[52] U.S. Cl. .................................... 548/590; 348/584; 348/578
[58] Field of Search .................... 358/183, 182, 22; H04N 5/262

[56] References Cited

U.S. PATENT DOCUMENTS

| | | | |
|---|---|---|---|
| 4,621,280 | 11/1986 | Shinohara et al. | 358/183 X |
| 4,684,990 | 8/1987 | Oxley | 358/183 |
| 4,718,089 | 1/1988 | Hayashi et al. | 358/22 CK X |
| 4,908,700 | 3/1990 | Ishii et al. | 358/22 CK |

FOREIGN PATENT DOCUMENTS

| | | |
|---|---|---|
| 0199489 | 10/1986 | European Pat. Off. |
| 2063616 | 6/1981 | United Kingdom |
| 2155729 | 9/1985 | United Kingdom |
| 2227903 | 8/1990 | United Kingdom |
| 2252009 | 7/1992 | United Kingdom |

Primary Examiner—Victor R. Kostak
Attorney, Agent, or Firm—Lerner, David, Littenberg, Krumholz & Mentlik

[57] ABSTRACT

A mixer for combining digital video signals allows four real-time signals to be combined. At each layer, a digital key signal may be generated from the input video signal using chroma or luminance keying. In addition, the video signal may be combined with drop shadows, a border and a fill to produce first-stage composite video and composite key signals. A composite key signal is produced by supplying two key signals to a comparator and a selector via respective switchable invertors. The comparator produces a selection signal which is supplied to the selector via a switchable invertor. The selector switches an input signal to produce an output signal which is supplied to an output port via a switchable converter.

8 Claims, 5 Drawing Sheets

COMBINING DIGITAL VIDEO KEY SIGNALS

BACKGROUND OF THE INVENTION

The present invention relates to combining digital key signals, to form a composite digital key signal for combining a first digital video signal with a second digital video signal.

Systems are known in which a first video image may be combined with a background video image in real time, to produce a real time video output signal. A known application of this technique involves removing a particular object from a first video image and placing said object against a different background. In order to remove the object, a particular characteristic of the signal, representing the object, may be selected, such as its color or its brightness. A first known technique generates a key in response to the presence of a particular color and this technique is commonly referred to as chroma keying. Alternatively, the technique of using brightness levels to generate a key signal is referred to as luminance keying. Thus, in chroma keying, a key signal may be derived from all areas of the picture in which a particular color is present (usually a saturated blue) and the output signal is produced by adding the two input signals together, after the background image has been multiplied by the value of the key k and the foreground image has been multiplied by the key value subtracted from unity, 1-k.

Keying is also employed when a video signal is manipulated by a video effects machine. Video effects machines are arranged to manipulate complete frames to produce an image which is smaller than the full video picture. The manipulated image is then usually placed against a background image and, therefore, the video effects machine must generate a key signal defining the shape of the manipulated image, which is then used to combine the manipulated image with a background image, using two multiplying stages and an adding stage, as described above.

In recent years, in both television broadcasting and video post-production, there has been a move away from conventional analog processing and towards digital processing. Thus, original video recordings may be made using a digital format, or photographic films may be converted to digital video, whereafter all of the mixing and post-production manipulations may be performed in the digital domain, thereby allowing many more manipulations to be made without degrading the integrity of the video signal.

A digital video signal defines an array of discrete picture point data and, unless great care is taken, images may be created which cannot be properly represented by the picture points, resulting in aliasing which expresses itself in the form of visible jaggies. Thus, for example, key signals may be produced which have very sharp transitions and, unless said transitions occur at boundaries between adjacent picture points, they cannot be properly represented by the digital signal and undesirable artefacts will be introduced. It is known to produce key signals with so-called "soft" edges, in which a transition between two extreme levels occurs over a plurality of picture points, such that a boundary exists over which, rather than a sharp transition occurring between the two images, the images actually merge together and, although an actual borderline between the images does not exist, such a border is still perceived by the eye, to the extent that the newly-combined foreground and background components are accepted as being part of a common image.

With techniques available for combining two video images, demand has grown for systems which are capable of combining more than two images. However, a particular problem which is encountered when attempting to provide such a facility is that a composite key must be produced for keying previously combined images against additional images or against a background. In accordance with a known technique, signals may be combined by multiplication. However, if two linear keys, having values ranging between zero and unity, are multiplied together, the result is non-linear and if such a non-linear key is used to combine partial images against the background, a visible border may be produced between the combined images and the background. Furthermore, as more and more key signals are combined together in this way, undesirable artefacts of this type become more and more apparent, easily resulting in a totally unacceptable end-product.

An alternative approach to combining key signals is to add the key signals together. However, if two key signals are to be combined which lie within the range of zero to unity and the output is also to lie within this range, sums greater than unity, when produced, will result in the new key saturating. Thus, a result of such a process is to effectively increase the gradient of the key signal which, although producing a linear key, produces harder edges which in turn may introduce artefacts due to aliasing, as previously described. Again, as the number of key signals added together increases, the problem becomes worse and worse and soon becomes clearly visible in the final picture.

It is an object of the present invention to provide an improved apparatus for combining digital key signals to form composite digital key signals. In particular, it is an object of the present invention to provide an apparatus for the multiple combination of digital key signals, without introducing undesirable artefacts.

SUMMARY OF THE INVENTION

According to a first aspect of the present invention, there is provided a video signal processing apparatus having means for manipulating digital video signals and digital key signals, including means for combining said digital key signals to form a composite digital key signal, comprising: first selection means, means for supplying a first digital key signal and a second digital key signal to said selection means, comparison means, means for supplying said first digital key signal and said second digital key signal to said comparison means to produce a selection signal, and operating said selection means in response to said selection signal to produce a composite digital key signal.

Figure 1A:
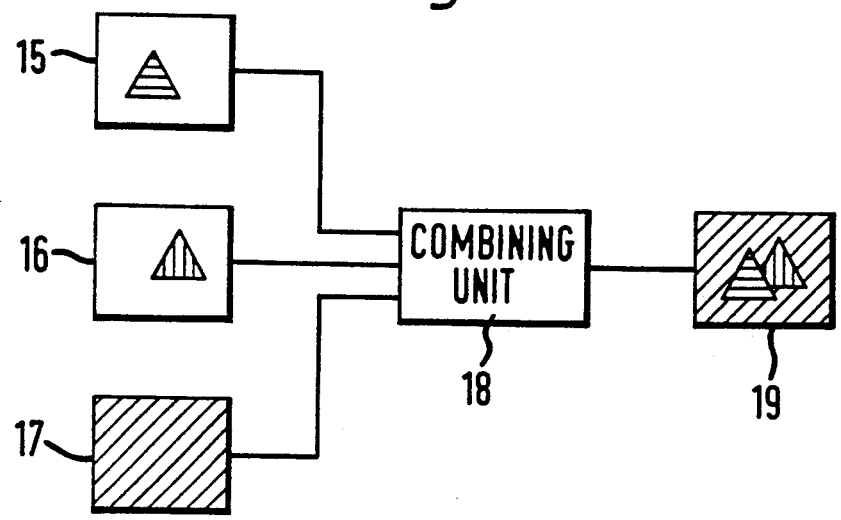
FIG. 1A illustrates a system for combining two partial video images against a background image.

A system for combining two partial video images to produce a composite image is shown in FIG. 1A. Each video signal is illustrated by means of a frame of the video image. Thus, a first video signal is represented by a first video image 15, a second video signal is represented by a second video image 16 and a background video signal is represented by image 17. Each video image signal 15,16 has, associated therewith, a digital key signal, which defines the area of the image in which the picture appears. The video image and key signals are supplied to a combining unit 18, arranged to produce an output video signal, illustrated by an output composite image 19, in which the partial image from 15 is placed above the partial image from 16, which are in turn placed over the background image 17.

A key signal must be generated to control the background image 17 which, as seen from image 19, will be different from the key signal associated with image 15 and different from the key signal associated with image 16. The combining unit 18 must, therefore, be arranged to generate a composite key signal from the key signals associated with images 15 and 16.

Figure 1B:
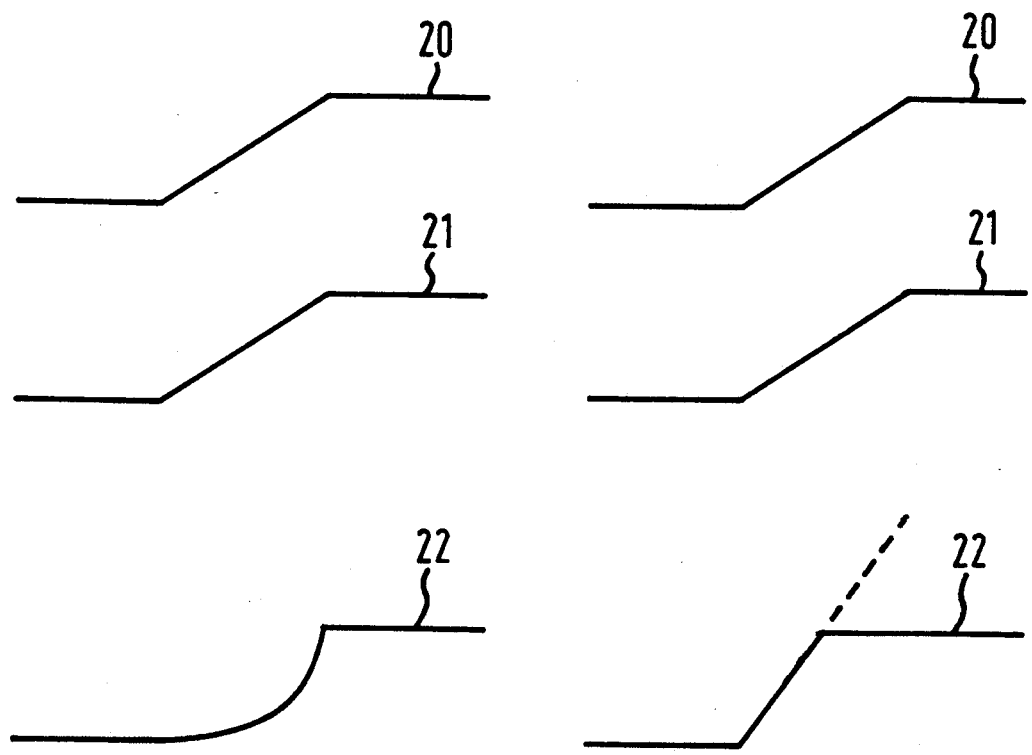
FIG. 1B illustrates two digital key signals and combined key signals obtained by known multiplicative and additive techniques.

FIG. 1B illustrates the shape of typical key signals generated across a single scan line for images 15 and 16. These key signals are digital key signals and their values increase in discrete steps. However, the steps define a gradual transition and are illustrated by straight lines in FIG. 1B. A key signal 20 associated with the first image 15 may be combined with a key signal 21, associated with the second image 16, by multiplying said key signals together, to produce key signal 22. The key signals have values between zero and unity. Therefore, for two overlapping key signals as shown in FIG. 1B, the value produced when each key signal has a value of 0.5 is 0.25 and so on, resulting in a non-linear profile as shown by key signal 22. Such a key signal may be unsuitable for keying video signals, as it may result in an unsatisfactory final image, although some proprietary equipment does operate in this way and the resulting artefacts are accepted by users.

An alternative approach is to add the two key signals together and the result of such a combination is illustrated by key signal 23 in FIG. 1B. Adding the key signals together produces results which exceed the maximum allowable value of unity, resulting in a key signal which, over the allowable range, has harder edges. Consequently, this key signal may also result in an unsatisfactory combination of video images, producing an undesirable final image.

DESCRIPTION OF THE PREFERRED EMBODIMENT

Figure 2:
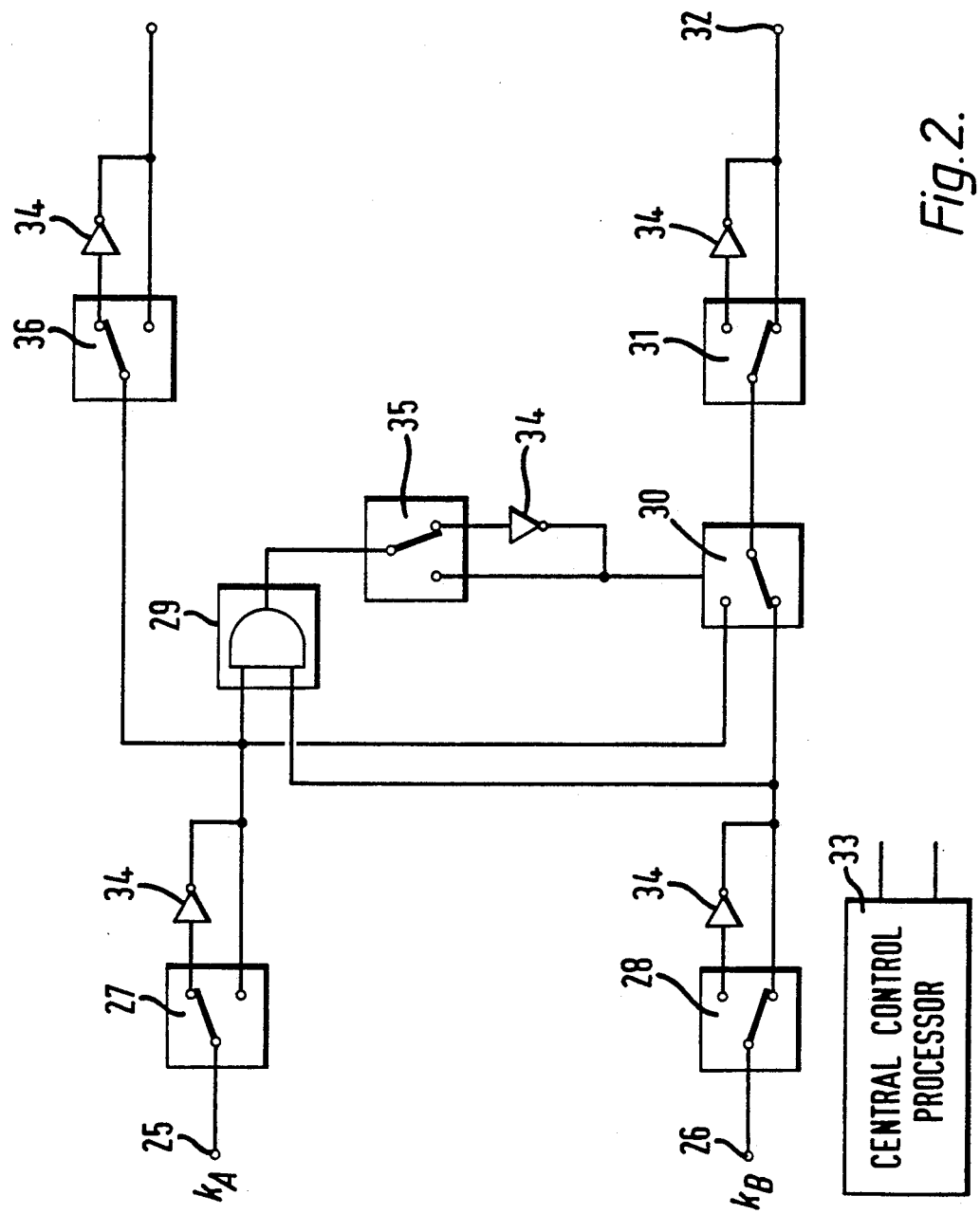
FIG. 2 shows a system for combining digital key signals employing the present invention.

An apparatus for combining digital key signals and embodying an aspect of the present invention, is shown in FIG. 2. A first digital key signal KA is received at an input port 25 and a second digital key signal KB is received at an input port 26. The input key signals KA and KB are supplied, via respective input inversion switches 27 and 28, to a key comparator 29 and to a key selector 30. The output from the key selector 30 is supplied to an output inversion switch 31, which is in turn supplied as an output to a key output port 32.

Input inversion switches 27 and 28, along with output inversion switch 31, are operated in response to signals from a central control processor 33. Invertors 34, have the effect of subtracting the signal supplied thereto from unity. Such signals are distinguished from their non-inverted relatives by using the equivalent signal used for identifying said relative with a bar placed over said symbol. In the drawings, such signals will be shown in this form and in the following description they will be described as k or k bar.

Figure 3A:
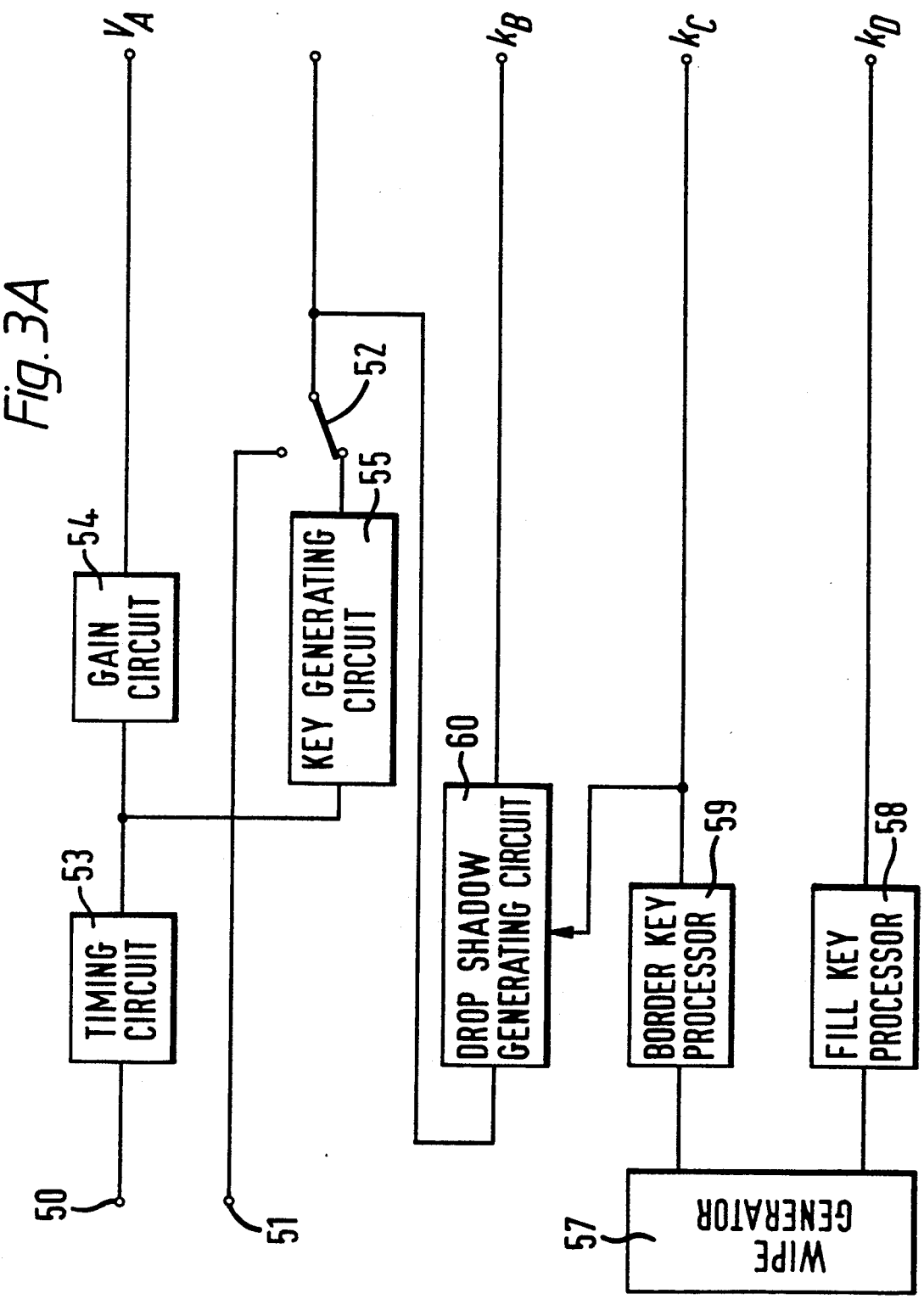
FIG. 3A and FIG. 3B show a video signal processing apparatus embodying the present invention.
Figure 3B:
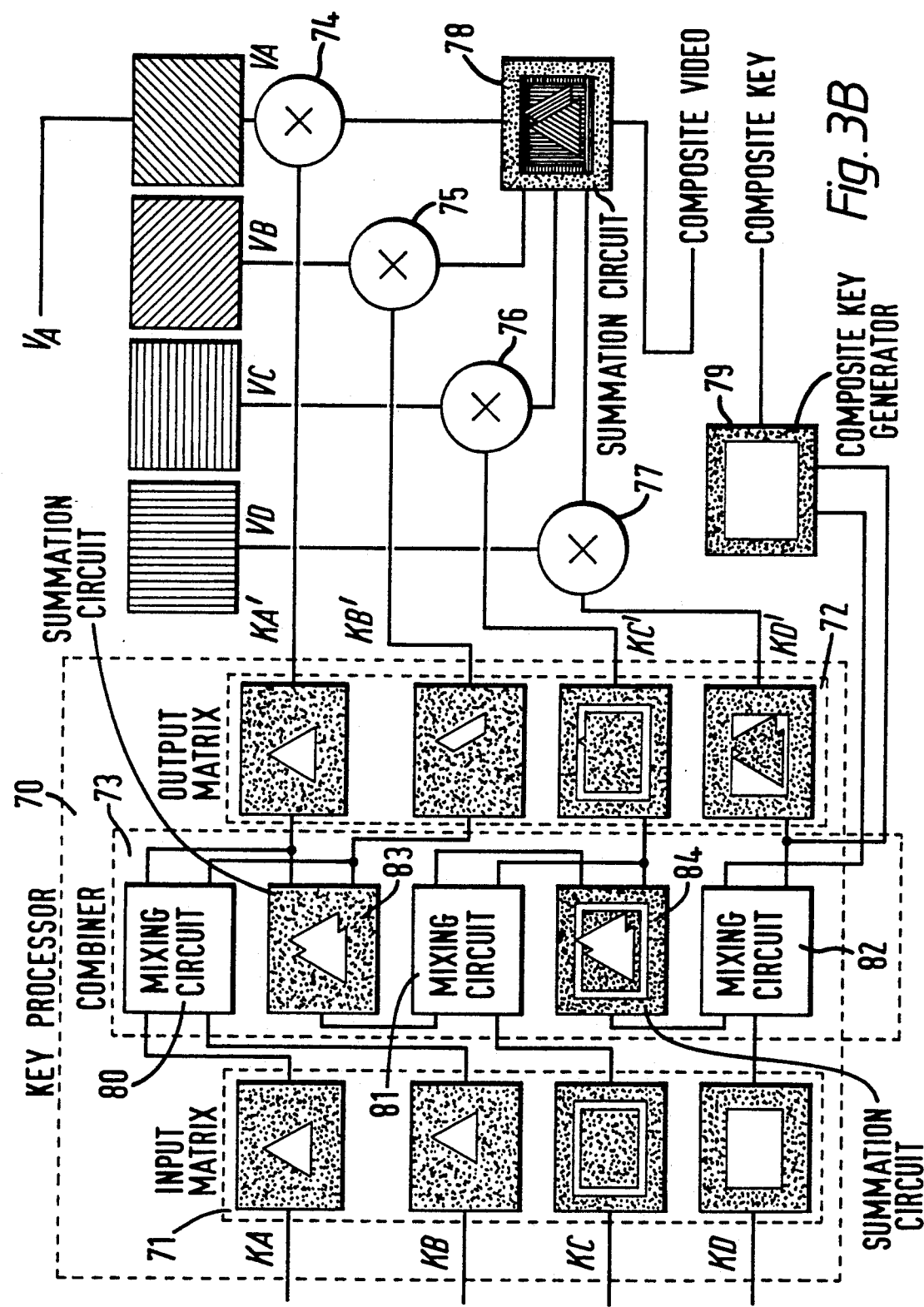

A key generation circuit is shown in FIGS. 3A and 3B, having a video input port 50 and a key signal input port 51. The circuit includes a switch 52, operated under the control of a central control processor 33, arranged to switch between an external key signal, supplied to port 51 and a key signal generated within the key generating circuit itself. The video input port 50 is arranged to receive standard 601 digital video signals, which are retimed by a timing circuit 53, which is also arranged to demultiplex luminance and color difference data. The output from the retiming circuit 53 is supplied to both a video lift and gain circuit 54 and to a key generation circuit 55. The video lift and gain circuit is, as its name suggests, arranged to translate and amplify the video data so as to normalize said data, thereby rendering it compatible with similar video data received at the other three inputs.

The key generation circuit is arranged to generate a key signal from the video signal supplied to the video input port 50 and a plurality of known keying techniques may be employed, such as chroma keying and luminance keying, under operator and program control.

The circuit shown in FIG. 3A also includes a wipe generator 57 arranged to generate a wipe shape, such that the video signal is placed within said shape. Thereafter, under the manual control of an operator or under program control, said shape may be used to effect a wipe, in which the area of the video image displayed gets smaller or larger, while retaining the wipe shape. As the video signal is removed, it is replaced by a solid color or fill and may, under operator control, be surrounded by a different color border. The wipe generator 57 is, therefore, arranged to generate a fill key (KD), which may be adjusted by a fill key processor 58 and a border key (KC), which may be processed by a similar border key processor 59. In addition, a fourth key (KB) representing a drop shadow may also be generated from either the key generated by the key generation circuit 55 or from the key generated by the border key processor 59, by means of a drop shadow generating circuit 60.

The key signal generated by the key generation circuit 55 is referred to as the processor key signal and it, along with the fill key signal, the border key signal and the drop shadow key signal are supplied to a key processor 70, FIG. 3B, comprising a four-by-four input switching matrix 71, a key combiner 73 and an output switching matrix 72.

Video signals to be keyed by the key signals KA, KB, KC and KD are identified as VA,VB,VC and VD. It will be assumed that signal A, the input live video, has priority over signal B (drop shadow) which has priority over signal C (border) which in turn has priority over signal D (fill) and that these, when combined, will then be placed over a background signal. The switching and combining circuit 70 produces key signals KA',KB',KC' and KD' which are supplied to respective multipliers 74,75,76 and 77. The multipliers receive respective video signals VA,VB,VC and VD and the outputs from said multipliers are combined in a summation circuit 78 to produce the composite image, which is diagrammatically placed over said summation circuit 78 in FIG. 3B. In addition, the switching and combining circuit 70 also produces a composite key signal in composite key generator 79, for keying the composite video signal against a background.

The combiner circuit 73 includes three non-additive mixing circuits 80, 81 and 82, of the type shown in FIG. 2 and two summation circuits 83 and 84. The key signal with the highest priority, in this case KA, is supplied to the input of switch 27 of circuit 80, while the key signal with the immediately lower priority, in this case KB, is supplied to the input of switch 28. Switch 27 is programmed to supply the signal KA to inverter 34, and the inverted signal is thereafter supplied to the comparator 29. As its second input, the comparator 29 receives the non-inverted signal KB via switch 28. The comparator 29 is arranged to detect the larger of the two input signals and in response to this, sends an appropriate signal to the comparator controlled switch 30 via switch 35 and its associated inverter 34, which selects an output dependent upon the comparison made in comparator 35.

To assist in the understanding of the circuit shown in FIGS. 2, 3A and 3B, various devices are shown with images placed over the device outline, wherein the image represents the output from that device. In the example, a live video image consisting of a coloured triangle placed against a saturated blue background is supplied to input 50. This image does not have an associated key signal and therefore no signal is applied to input port 51. Switch 52 is placed in the lower position, as shown in FIG. 3A and a key signal is produced by a key signal generating circuit 55 by chroma keying, thus the coloured triangle against a blue background is the signal supplied to multiplier 74 in FIG. 3B and a key signal KA is supplied to the input matrix 71.

The key signal KA is represented by a white triangle against the black background. When key signal KA is used to key video signal VA, a coloured triangle will be shown but the blue background will be screened off, thereby allowing the coloured triangle to be combined with other images. The key signal KA, may therefore, be visualised as a mask, however, the edge of the mask is not a sharp transition and consists of a linear ramp which varies between zero and unity over a plurality of picture points.

Referring to FIG. 3B and FIG. 2, circuit 80 combines a digital key signals KA and KB to form a composite digital key signal. As previously stated, circuit 80 is detailed in FIG. 2, having a first selection means 30 arranged to receive a first digital key signal KA and second digital signal KB. In addition, the circuit has comparison means 29 again arranged to receive first digital key signal and a second digital key signal so as to produce a selection signal, wherein operation of the selection means is made in response to said selection signal so as to produce a composite digital key signal.

Figure 4:
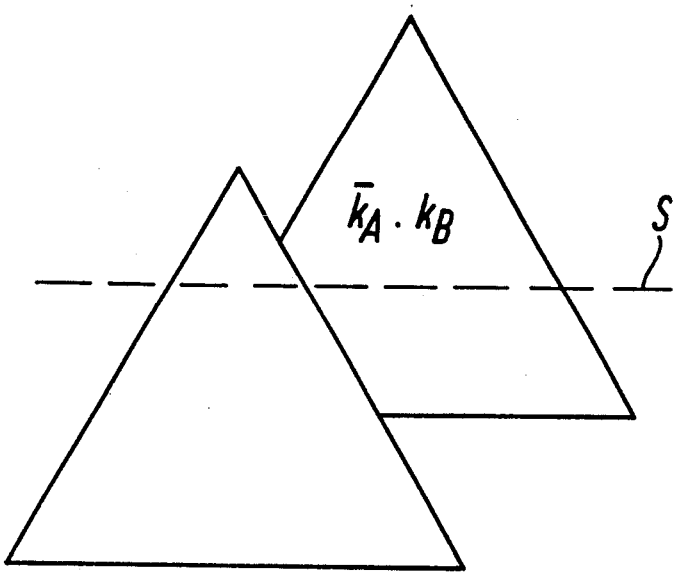
FIG. 4 illustrates the operation of the apparatus shown in FIG. 3.
Figure 4:
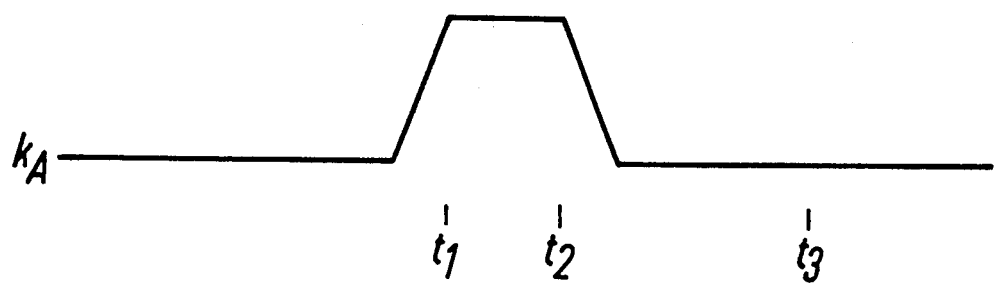
Figure 4:
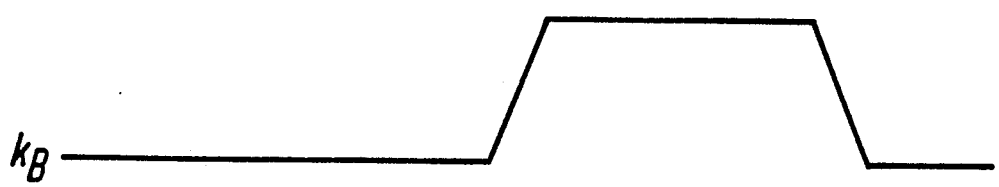
Figure 4:

Circuit 80 is arranged to generate composite key signal KB', which has a value of unity for regions of the image which are part of image B and not part of image A. In accordance with the definitions employed by set theory, composite key signal KB' is derived from the intersection of KA bar with KB. Referring to FIG. 2, the KA bar signal is obtained by placing switch 27 in its inverting position, whereas switch 28 is placed in its non-inverting position, so as to supply the signal KB to the comparator 29 and to the selector 30. In FIG. 4, key signals KA and KB are shown in greater detail, along with timing diagrams for a typical scan line S. At the start of the scan line, both KA and KB are equal to zero. Comparator 29 produces an output indicating which of its two inputs is the larger, therefore given that KA is inverted, KA bar is equal to unity and the output from comparator 29 identifies signal KA bar as the one to be selected. However, this signal is supplied to an inverter 34 via switch 35 so the signal selecting KA bar is itself inverted to a signal selecting KB and KB is selected by switch 30, which is in turn supplied to the output 32 via the non-inverting terminal switch 31. Switch 31 appears to be redundant but it is provided to ensure that all signals are passed through a similar number of switching stages so that they remain in synchronism.

As previously stated, comparator 29 produces a signal identifying the higher of its two inputs, however, given that this signal is supplied to the inverting mechanism of switch 35 and inverter 34, the effect of this combination is to produce an output signal identifying the smaller of the two inputs. Referring to FIG. 4, as signal KA increases, signal KA bar decreases but it still remains bigger than signal KB, so signal KB is selected At time t1, signal KA bar equals zero, therefore signal KA bar is selected. At time t2, signal KA starts to decrease, resulting in signal KA bar increasing, which is selected and supplied to the output. Signal KA bar continues to be selected until time t3, at which signal KB starts to decrease such that signal KB is selected and continues to be selected until the end of the line. Thus, the results of applying signals KA and KB to the circuit shown in FIG. 2 results in the signal KA bar. KB being produced as shown in FIG. 4.

Circuit 81 is substantially similar to circuit 80 and it receives as its first input a signal equivalent to the union of signal KA with signal KB, which is obtained by adding signal KA to signal KB, in adder 83. As its second input, circuit 83 receives signal KC, to produce an output KC', which is again the logical combination of KC combined with all the signals which do not fall within the area defined by the combination of KA with KB.

Thus, it can be seen that by using a plurality of circuits of the type shown in FIG. 2, any number of digital video key signals may be combined without introducing undesirable artefacts, either in the form of non-linearities, produced by multiplication or in the form of overflow, introduced when using standard addition.

The technique has been described in relation to keys generated from video signals, however, the technique may also be employed when using a plurality of live video images each having their own associated key signals. For example, four circuits of the type shown in FIGS. 3A and 3B may be combined so that four real-time video signals may be pre-processed so as to generate their own respective processed keys, along with drop shadows, borders and fills. Thereafter, a circuit substantially similar to that shown in FIG. 3B may be used to combine the four video images to produce a final composite image.

We claim:

1. Video signal processing apparatus having means for manipulating digital video signals and digital key signals, including means for combining said digital key signals to form a composite digital key signal, comprising:
  - selection means;
    first switchable inverting means;
    second switchable inverting means;
    third switchable inverting means;

means for supplying a first digital key signal to said first selection means via said first switchable inverting means;

means for supplying a second digital key signal to said first selection means via said second switchable inverting means;

comparison means;

means for supplying said first digital key signal via said first switchable inverting means to said comparison means;

means for supplying said second digital key signal via said second switchable inverting means to said comparison means to produce a selection signal;

said selection means operating in response to said selection signal to produce a composite digital key signal, said composite digital signal being supplied to said third switchable inverting means to produce an output signal.

2. Video signal processing apparatus according to claim 1, further including fourth switchable inverting means, wherein said selection signal is supplied to said selection means via said fourth switchable inverting means.

3. Video signal processing apparatus according to claim 1, further including means for processing a digital video signal to produce at least one of said first and said second digital key signals.

4. Video signal processing apparatus according to claim 1, further including pre-processing means arranged to generate a processed key signal derived from said video signal, means for generating a key signal representing the position of a drop shadow, means for generating a key signal representing the position of a border, and means for combining said generated key signals to produce a composite key signal.

5. A method of processing digital video key signals, comprising the steps of:

supplying a first digital key signal to a selection means via a first switchable inverting means, supplying a second digital key signal to said selection means via a second switchable inverting means, supplying said first digital key signal to a comparison means via said first switchable inverting means, supplying said second digital key signal to said comparison means via said second switchable inverting means, operating said selection means in response to an output from said comparison means and conveying an output digital signal from said selection means to an output port via a third switchable inverting means.

6. A method of processing digital video key signals according to claim 1, further comprising the step of supplying said output from said comparison means to said selection means via a fourth switchable inverting means.

7. A method of processing digital video key signals according to claim 5, further comprising the step of producing at least one of said first and said second digital key signals by processing a digital video signal.

8. A method of processing digital video key signals according to claim 5, further comprising the steps of deriving said key signals from video signals and selecting a first key signal representing a drop shadow, selecting a second key signal representing a border, and combining said drop shadow key signal and said border key signal to produce a composite key signal.

* * * * *

UNITED STATES PATENT AND TRADEMARK OFFICE
CERTIFICATE OF CORRECTION

PATENT NO. : 5;305,107
DATED : April 19, 1994
INVENTOR(S) : Gale et al.

It is certified that error appears in the above-indentified patent and that said Letters Patent is hereby corrected as shown below:

Column 6, line 34, "KB" should read --KB'--.

Column 8, line 20, "1," should read --5,--.

Signed and Sealed this

Second Day of August, 1994

Attest:

BRUCE LEHMAN

Attesting Officer         Commissioner of Patents and Trademarks